US011580806B2

(12) United States Patent
Lundberg

(10) Patent No.: US 11,580,806 B2
(45) Date of Patent: Feb. 14, 2023

(54) CO-SIGNING DELEGATIONS

(71) Applicant: ASSA ABLOY AB, Stockholm (SE)

(72) Inventor: Frans Lundberg, Saltsjöbaden (SE)

(73) Assignee: ASSA ABLOY AB, Stockholm (SE)

( * ) Notice: Subject to any disclaimer, the term of this patent is extended or adjusted under 35 U.S.C. 154(b) by 0 days.

(21) Appl. No.: 17/413,077

(22) PCT Filed: Dec. 18, 2019

(86) PCT No.: PCT/EP2019/085941
§ 371 (c)(1),
(2) Date: Jun. 11, 2021

(87) PCT Pub. No.: WO2020/127475
PCT Pub. Date: Jun. 25, 2020

(65) Prior Publication Data
US 2022/0028198 A1 Jan. 27, 2022

(30) Foreign Application Priority Data
Dec. 20, 2018 (EP) ..................... 18214679

(51) Int. Cl.
*G07C 9/20* (2020.01)
*G07C 9/00* (2020.01)
*H04L 9/32* (2006.01)

(52) U.S. Cl.
CPC ......... *G07C 9/215* (2020.01); *G07C 9/00309* (2013.01); *H04L 9/3247* (2013.01); *G07C 2009/00428* (2013.01)

(58) Field of Classification Search
CPC ............... G07C 9/215; G07C 9/00309; G07C 2009/00428; G07C 2009/0088;
(Continued)

(56) References Cited

U.S. PATENT DOCUMENTS 8,052,060 B2 * 11/2011 Yacoub .................... G07C 9/27
235/382
8,504,909 B2 * 8/2013 Yuan ....................... G06F 16/81
715/234
(Continued)

FOREIGN PATENT DOCUMENTS

CN 104980274 10/2015
CN 107886336 4/2018
(Continued)

OTHER PUBLICATIONS

Official Action for European Patent Application No. 18214679.5, dated Sep. 3, 2021, 8 pages.
(Continued)

*Primary Examiner* — Nam V Nguyen
(74) *Attorney, Agent, or Firm* — Sheridan Ross P.C.

(57) ABSTRACT

It is provided a method for controlling access to a physical space using a co-sign delegation. The method is performed in a lock device and comprises the steps of: receiving an access request from an electronic key; obtaining a plurality of delegations, wherein each delegation is a delegation from a delegator to a delegatee, the plurality of delegations collectively forming a chain of delegations; determining that a delegation is a co-sign delegation, indicating that all further delegations need to be cryptographically signed by both the delegator of the respective delegation and by an access controller; and granting access to the physical space when the chain of delegations start in an owner of the lock
(Continued)

device and ends in the electronic key; and when all delegations in the chain of delegations after the co-sign delegation are cryptographically signed by both the delegator of the respective delegation and by the access controller.

13 Claims, 2 Drawing Sheets

(58) Field of Classification Search
CPC ............ G07C 9/00857; G07C 9/00571; G07C 2209/08; H04L 9/3247
USPC .......................................................... 340/5.21
See application file for complete search history.

(56) References Cited

U.S. PATENT DOCUMENTS

| | | | | |
|---|---|---|---|---|
| 9,514,117 | B2* | 12/2016 | Gonser | G06F 40/186 |
| 9,954,683 | B2* | 4/2018 | Ali | H04L 9/3247 |
| 11,011,002 | B2* | 5/2021 | Lundberg | G07C 9/20 |
| 11,328,543 | B2* | 5/2022 | Lundberg | H04L 63/101 |
| 2012/0157079 | A1* | 6/2012 | Metivier | G07C 9/00182 |
| | | | | 455/420 |
| 2017/0352207 | A1* | 12/2017 | Siklosi | G07C 9/27 |
| 2019/0213810 | A1* | 7/2019 | Lundberg | H04L 9/088 |
| 2020/0058180 | A1* | 2/2020 | Olsson | H04L 63/0823 |

FOREIGN PATENT DOCUMENTS

| | | |
|---|---|---|
| EP | 3358534 | 8/2018 |
| JP | 2016-220062 | 12/2016 |
| WO | WO 2018/154058 | 8/2018 |

OTHER PUBLICATIONS

Taly et al. "Distributed Authorization in Vanadium," arxiv.org, Jul. 7, 2016, 24 pages.
Extended Search Report for European Patent Application No. 18214679.5, dated May 28, 2019, 6 pages.
International Search Report and Written Opinion for International (PCT) Patent Application No. PCT/EP2019/085941, dated Feb. 27, 2020, 13 pages.
Written Opinion of the International Preliminary Examining Authority for International (PCT) Patent Application No. PCT/EP2019/085941, dated Nov. 19, 2020, 7 pages.
International Preliminary Report on Patentability for International (PCT) Patent Application No. PCT/EP2019/085941, dated Mar. 11, 2021, 27 pages.
Official Action with English Translation for China Patent Application No. 201980083903.1, dated Jul. 19, 2022, 17 pages.
Official Action with English Translation for China Patent Application No. 201980083903.1, dated Dec. 1, 2022, 8 pages.

* cited by examiner

CO-SIGNING DELEGATIONS

CROSS REFERENCE TO RELATED APPLICATIONS

This application is a national stage application tinder 35 U.S.C. 371 and claims the benefit of PCT Application No. PCT/EP2019/085941 having an international filing date of Dec. 18, 2019, which designated the United States, which PCT application claimed the benefit of European Patent Application No. 18214679.5 filed Dec. 20, 2018, the disclosure of each of which are incorporated herein by reference.

TECHNICAL FIELD

The present disclosure relates to the field of controlling access to physical space using delegated access including a co-sign delegation, such that at least one delegation in a delegation chain needs to be co-signed by an access controller.

BACKGROUND

Locks and keys are evolving from the traditional pure mechanical locks. These days, electronic locks are becoming increasingly common. For electronic locks, no mechanical key profile is needed for authentication of a user. The electronic locks can e.g. be opened using an electronic key stored on a special carrier (fob, card, etc.) or in a smartphone. The electronic key and electronic lock can e.g. communicate over a wireless interface. Such electronic locks provide a number of benefits, including improved flexibility in management of access rights, audit trails, key management, etc.

From time to time, the lock owner controlling the lock device needs to give access to service providers for delivery of a service. The service can be any service where the person performing the service needs the electronic lock to be opened. For instance, the service can be a home care service, a delivery of a product, a cleaning service, a builder/plumber/electrician, etc. To be able to consume the service, the lock owner thus needs to provide access to a service provider using the electronic lock.

It greatly simplifies lock installation if the lock device does not need to be connected to a network, i.e. an offline installation. However, one issue in offline implementation is how to control access to the lock.

SUMMARY

It is an object of the present disclosure to enable a lock owner to revoke access for service providers for an offline lock, when the lock owner is not aware of the exact identity of the service provider agent assigned to deliver the service.

According to a first aspect, it is provided a method for controlling access to a physical space using a co-sign delegation. The method is performed in a lock device and comprises the steps of: receiving an access request from an electronic key; obtaining a plurality of delegations, wherein each delegation is a delegation from a delegator to a delegatee, the plurality of delegations collectively forming a chain of delegations wherein when two delegations are chained together, the delegatee of one delegation is the delegator of the next delegation; determining that a delegation in the chain of delegations is a co-sign delegation, the co-sign delegation indicating that all further delegations need to be cryptographically signed by both the delegator of the respective delegation and by an access controller; and granting access to the physical space when the chain of delegations start in an owner of the lock device and ends in the electronic key; and when all delegations in the chain of delegations after the co-sign delegation are cryptographically signed by both the delegator of the respective delegation and by the access controller.

The chain of delegations after the co-sign delegation may comprise at least two delegations.

The method may further comprise the step of: evaluating an access controller time constraint applied by the access controller on a delegation of the chain of delegations, and wherein the step of granting access is only performed when the access controller time constraint is not violated.

The access controller time constraint may be 24 hours or less.

The method may further comprise the step of: evaluating a delegator time constraint applied by a delegator on a delegation of the chain of delegations, and wherein the step of granting access is only performed when the delegator time constraint is not violated.

The step of obtaining a plurality of delegations may comprise receiving at least part of the chain of delegations from the electronic key.

In the co-sign delegation, the access controller may be specified by a public key of the access controller.

According to a second aspect, it is provided a lock device for controlling access to a physical space using a co-sign delegation. The lock device comprises: a processor; and a memory storing instructions that, when executed by the processor, cause the lock device to: receive an access request from an electronic key; obtain a plurality of delegations, wherein each delegation is a delegation from a delegator to a delegatee, the plurality of delegations collectively forming a chain of delegations wherein when two delegations are chained together, the delegatee of one delegation is the delegator of the next delegation; determine that a delegation in the chain of delegations is a co-sign delegation, the co-sign delegation indicating that all further delegations need to be cryptographically signed by both the delegator of the respective delegation and by an access controller; and grant access to the physical space when the chain of delegations start in an owner of the lock device and ends in the electronic key; and when all delegations in the chain of delegations after the co-sign delegation are cryptographically signed by both the delegator of the respective delegation and by the access controller.

The chain of delegations after the co-sign delegation may comprise at least two delegations.

The lock device may further comprise instructions that, when executed by the processor, cause the lock device to: evaluate an access controller time constraint applied by the access controller on a delegation of the chain of delegations, and wherein the instructions to grant access is only performed when the access controller time constraint is not violated.

The access controller time constraint may be 24 hours or less.

The lock device may further comprise instructions that, when executed by the processor, cause the lock device to: evaluate a delegator time constraint applied by a delegator on a delegation of the chain of delegations, and wherein the instructions to grant access are only performed when the delegator time constraint is not violated.

The instructions to obtain a plurality of delegations may comprise instructions that, when executed by the processor, cause the lock device to receive at least part of the chain of delegations from the electronic key.

In the co-sign delegation, the access controller may be specified by a public key of the access controller.

According to a third aspect, it is provided a computer program for controlling access to a physical space using a co-sign delegation. The computer program comprises computer program code which, when run on a lock device causes the lock device to: receive an access request from an electronic key; obtain a plurality of delegations, wherein each delegation is a delegation from a delegator to a delegatee, the plurality of delegations collectively forming a chain of delegations wherein when two delegations are chained together, the delegatee of one delegation is the delegator of the next delegation; determine that a delegation in the chain of delegations is a co-sign delegation, the co-sign delegation indicating that all further delegations need to be cryptographically signed by both the delegator of the respective delegation and by an access controller; and grant access to the physical space when the chain of delegations start in an owner of the lock device and ends in the electronic key; and when all delegations in the chain of delegations after the co-sign delegation are cryptographically signed by both the delegator of the respective delegation and by the access controller.

According to a fourth aspect, it is provided a computer program product comprising a computer program according to the third aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments of the invention are shown. These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Embodiments presented herein are based on delegation chains from an owner of the lock device, via one or more intermediate nodes to the service provider agent. The delegation chain allows the lock device to be offline. Additionally, the delegation chain requires co-signing by an access controller. In this way, the lock owner can interact with the access controller to control when the access controller should co-sign delegations and when it should not. This provides a solution which is offline for the lock device, while the lock owner can still control who is allowed to gain access to a restricted physical space. At the same time, the access controller is not given access per se, only the ability to approve access for other entities.

Figure 1:
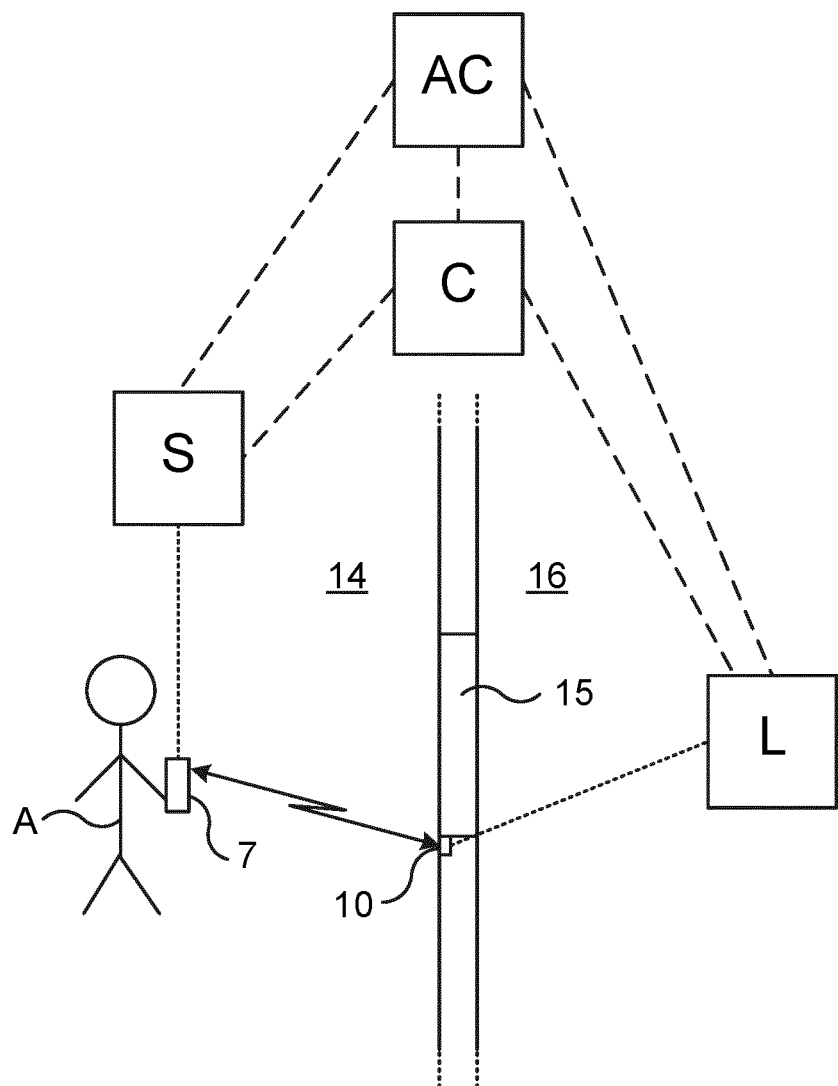
FIG. 1 is a schematic diagram showing an environment in which embodiments presented herein can be applied.

FIG. 1 is a schematic diagram showing an environment in which embodiments presented herein can be applied. Access to a physical space 16 is restricted by a physical barrier 15 which is selectively unlockable using a lock device 10. The barrier 15 can be a door, gate, hatch, cabinet door, drawer, window, etc. The physical barrier 15 is provided in a surrounding physical structure (being a wall, fence, ceiling, floor, etc.) and stands between the restricted physical space 16 and an accessible physical space 14. Note that the accessible physical space 14 can be a restricted physical space in itself, but in relation to this physical barrier 15, the accessible physical space 14 is accessible.

The owner L or user of the lock device 10 is here denoted a lock owner L. The lock owner L may carry a lock owner device, which is any suitable electronic device, e.g. a smartphone, mobile phone, tablet computer, laptop computer, desktop computer, smart television, set top box, etc.

The lock device 10 can communicate with electronic keys. Such electronic keys may be implemented as part of a mobile phone, a smartphone, a key fob, wearable device, smart phone case, access card, electronic physical key, etc. The electronic key can communicate with the lock device 10 over a wired or wireless interface, e.g. using Bluetooth, Bluetooth Low Energy (BLE), any of the IEEE 802.15 standards, Radio Frequency Identification (RFID), Near Field Communication (NFC), a serial interface (e.g. RS485, RS232), Universal Serial Bus (USB), or even a simple electric connection with a custom communication protocol.

There is also a service provider S. The service provider S can e.g. be a home care company, a delivery company, a cleaning company, a building company, a plumber, an electrician, etc. The service provider S can also be provided by a third party, on behalf of the service provider.

As explained in more detail below, the lock owner L wants a service to be delivered by the service provider S, which requires access to the restricted physical space 16. The service provider S uses a service provider agent A to deliver the service. The service provider agent A is a physical person and can be an employee or a sub-contractor of the service provider. The service provider agent A carries a service provider agent device 7, which is a portable electronic device, e.g. a smartphone, mobile phone tablet computer, laptop computer, etc. The functions described herein as being performed by the service provider agent, can e.g. be performed in a software application (also known as app) executing on the service provider agent device 7.

An access controller AC is a controlling entity to the access delegation. When used as described in embodiments herein, the access controller AC allows or disallows delegation of access rights but is not given the access right itself. Hence, the access controller AC can be used to invalidate key devices without the access controller AC itself gaining access rights to open a lock device. The lock owner L can interact with the access controller AC, e.g. via a web interface to, to control the actions of the access controller AC with regard to access rights owned by the lock owner L.

Communication between the different nodes in FIG. 1 can occur using local communication, e.g. using Bluetooth, Bluetooth Low Energy (BLE), any of the IEEE 802.15 standards, any of the IEEE 802.11 standards, wireless USB (Universal Serial Bus), USB, Ethernet, serial connection (e.g. RS-485), etc. and/or over wide area communication such as cellular networks and the Internet. On a higher layer, Internet Protocol (IP) could be used for the communication, internally and/or externally.

Now the concept of delegation of access rights will be explained and how this is employed in embodiments presented herein. Each delegation is a delegation from a delegator to a delegatee. The plurality of delegations collectively form a chain of delegations. For each link in the chain, when two delegations are chained together, the delegatee of one delegation is the delegator of the next delegation, forming a single path from the original delegator to the final delegatee in the chain of delegations. Each entity in the delegation chain, i.e. all delegators and delegatees use physical devices such as portable devices or computers/servers in the operations using delegations. In other words, whenever it is mentioned that a party is a delegator or delegatee in this document, this is implemented in such a physical device.

The plurality of delegations may form a chain. For instance, consider the following example of a chain of delegation:

L→C→S→A

Using the reference signs used above, L denotes the lock owner, C denotes the coordinator, S denotes the service provider and A denotes the service provider agent. Hence, this chain of delegations starts in the lock owner, and proceeds from the lock owner, to the coordinator, to the service provider, and to the service provider agent. When this delegation is valid, the service provider is delegated access, indirectly, by the lock owner.

Each arrow is a delegation and each delegation is a data item which can be communicated over a digital communication channel and can be stored in memory. Each delegation contains (references to) a delegator and a delegatee. All delegations can use the same data format, making extensions to the delegation chain or structure of delegations simple, thereby improving flexibility in the delegation chain. Moreover, by employing the same data format for all the delegations, it is easier and more consistent for the lock device, which eventually checks the validity of the delegation chain, to check the delegations in the delegation chain.

The delegation is cryptographically signed by the delegator, using any suitable signing algorithm and a private key of the delegator. The signature can be verified using a public key (corresponding to the private key) of the delegator. The cryptographical signature can be appended to the delegation.

In the following, a signed delegation is indicated by a double line delegation. For instance, the following denotes a delegation from the coordinator to the service provider, where the delegation is cryptographically signed by the coordinator.

C==>S

When the service provider agent arrives and needs the lock device to unlock, the service provider agent (or more specifically, the service provider agent device 7) transmits at least the last delegation in the chain of delegations to the lock device. In one embodiment, only the first delegation (from the lock device) is stored in the lock device. All later delegations in the chain of delegations are transmitted from the service provider agent.

According to embodiments herein, a delegation can also contain a requirement, set by the delegator, that further delegations need to be cryptographically signed by an access controller. Such a delegation is here denoted (co:AC), where 'AC' denotes the access controller of which the signature is required. The access controller can e.g. be identified by its public key.

The following example denotes a delegation from the lock owner to the coordinator, with a co-sign requirement that later delegations, in the chain of delegations, need to be signed by the access controller AC.

L-(co:AC)→C

A more detailed example of a delegation chain with co-sign requirements will now be described in the context of home care:

L-(co:AC)→C==(co:AC)==>S==(co:AC)==>A

The lock owner here uses a coordinator to select its home care provider. The coordinator in this case can be a municipality or city, e.g. the city of Stockholm. The lock owner can select a home care provider, i.e. a home care provider company, to use. In this example, the home care provider is denoted by S. The lock owner informs the coordinator of the selection.

The lock owner L creates a delegation to the coordinator C which is a co-sign delegation, requiring the access controller AC to co-sign any further delegations in the delegation chain. The coordinator C creates a co-sign delegation (also requiring the access controller AC to co-sign any further delegations) to the home care provider S. The co-sign delegation by the coordinator C is sent to the access controller AC to get signed. Once the co-sign delegation from the coordinator C is signed by the access controller AC, the co-sign delegation is transmitted to the delegatee, i.e. the home care provider S.

The home care provider S creates a co-sign delegation (also requiring AC to co-sign any further delegations) to a service provider agent A (i.e. a home care employee). The co-sign delegation by the home care provider S is sent to the access controller AC to get signed. Once the co-sign delegation from the home care provider S is signed by the access controller AC, this is transmitted to the service provider agent A, as well as the co-sign delegation delegated by the coordinator C.

When the service provider agent A arrives at the lock device, the service provider agent A sends an access request to the lock device 10. The service provider agent A also provides, from the chain of delegations, the delegation by the coordinator C to the service provider S and the delegation by the home care provider S to the service provider agent A. Both these delegations contain a signature by the access controller AC.

The lock device 10 also obtains the first delegation, from the lock owner L to the coordinator, e.g. from local memory.

The use of the chain of delegations allows the lock device 10 to verify the authority of any service provider agent A, to thereby determine whether the lock device 10 should set itself in an unlocked state to allow access to the restricted space 16. This verification is based on the delegations of the delegation chain, i.e. data provided by the service provider agent A and locally stored data. Hence, the lock device 10 does not need to have network access to perform this verification.

Time constraints can also be applied to allow more flexible revocation of access rights. For instance, there can be an access controller time constraint, where the access controller limits a validity time of its signature of a particular delegation. In this way, any delegation needing to be signed by the access controller need to be signed again after the access controller time constraint expires. In one embodiment, the access controller time constraint is 24 hours or less, implying that the access controller needs to sign pertinent delegations on a daily basis. Moreover, the delegation from the lock owner to the coordinator can securely be set with a long validity time, in the order of months or even years, since the access controller time constraint is shorter and can be controlled by the lock owner using an interface, e.g. a web interface, with the access controller.

Using the embodiments presented herein, advanced re-delegation rules can be enforced using the access controller AC. For instance, consider a rule where the service provider S can re-delegate the delegation from the coordinator (originating from the lock owner), but only to five delegatees at a time. Since each delegation by the service provider needs to be signed by the access controller AC, when a sixth delegation by the service provider S is attempted, the access controller AC can refuse to sign it. Another example is that the access controller AC can enforce a rule that a delegation can only be re-delegated to a member of a particular group of valid delegatees.

If a delegation needs to be revoked, the lock owner L can order the access controller to not apply any new signatures for delegations of the access right delegated by the lock owner. This allows an access right to be revoked even though the lock device 10 can be provided without network connectivity. It is to be noted that the revocation is not immediate, but is effected when the access controller time constraint expires. Hence, the lengths of the access controller time constraint determines how quickly a revocation has effect.

Using the co-sign delegation, the co-signer (access controller AC) can control further delegations, optionally using time constraints to force any delegatees to get a new signature regularly.

Significantly, using embodiments presented herein, the access controller AC has no access to the locks; the access controller can neither access locks using its own credentials, nor delegate access to anyone else. Still, the access controller can provide an interface, e.g. a web interface, to allow lock owners to control what entities (companies or individuals) that could be granted access to the restricted physical space.

Figure 2:
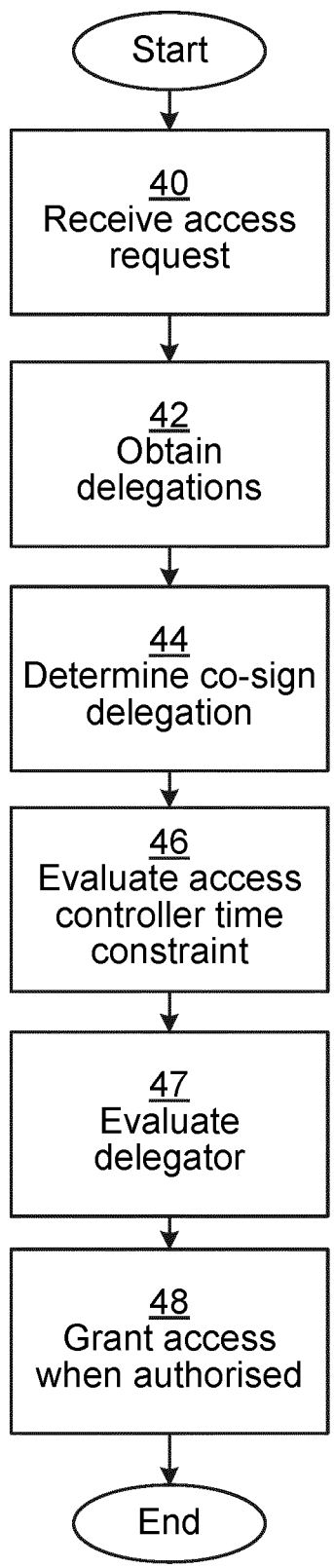
FIG. 2 is a flow chart illustrating method for controlling access to a physical space.

FIG. 2 is a flow chart illustrating method for controlling access to a physical space. The method being performed in a lock device.

In a receive access request step 40, the lock device receives an access request from an electronic key. The electronic key can e.g. belong to the service provider agent A of FIG. 1.

In an obtain delegations step 42, the lock device obtains a plurality of delegations. As explained above, each delegation is a delegation from a delegator to a delegatee. The plurality of delegations collectively form a chain of delegations. For each link in the chain, when two delegations are chained together, the delegatee of one delegation is the delegator of the next delegation, such that the chain of delegations form a single path from the original delegator to the final delegatee in the chain of delegations. In one embodiment, the first delegation in the chain of delegations is the co-sign delegation. In this case, it can be the owner of the lock device that is the delegator of the first delegation, thereby stipulating all further delegations to be approved an access controller.

At least part of the delegations in the chain of delegations can be received from the electronic key. In one embodiment, all delegations (in the chain of delegations), except the first delegation (by the lock owner) are received from the electronic key.

In a determine co-sign delegation step 44, the lock device determines that a delegation in the chain of delegations is a co-sign delegation. The co-sign delegation indicates that all further delegations need to be cryptographically signed by both the delegator of the respective delegation and by an access controller. In one embodiment, the chain of delegations after the co-sign delegation comprises at least two delegations. Since all further delegations need to be cryptographically signed by both the delegator of the respective delegation and by an access controller, as long as the delegator trusts the access controller, this enables the chain of delegations after the co-sign delegation to contain multiple delegations. The ability to have multiple delegations with great security improves flexibility, for instance if the lock owner uses a coordinator as described above, e.g. to select its home care provider.

The access controller is specified in the co-sign delegation. The access controller can be specified by a public key of the access controller. Alternatively, the access controller is specified by an identifier which can be associated with a public key.

In an optional evaluate access controller time constraint step 46, the lock device evaluates an access controller time constraint applied by the access controller on a delegation of the chain of delegations. In one embodiment, the access controller time constraint is 24 hours or less.

In an optional evaluate delegator time constraint step 47, the lock device evaluates a delegator time constraint applied by a delegator on a delegation of the chain of delegations.

In a grant access when authorised step 48, the lock device grants access to the physical space when the chain of delegations starts in the owner of the lock device and ends in the electronic key and when all delegations in the chain of delegations after the co-sign delegation are cryptographically signed by both the delegator of the respective delegation and by the access controller. Additionally, when an access controller time constraint is applied (see step 46 above), access is only granted when the access controller time constraint is not violated. Additionally, when a delegator time constraint is applied (see step 47 above), access is only granted when the delegator time constraint is not violated.

By requiring that all further delegations after the co-sign delegation need to be cryptographically signed by both the delegator of the delegation and by the access controller, the delegator of the co-sign delegation is assured that the access controller approves all further delegations. This prevents a dishonest delegatee in the chain from delegating to an unauthorised person, thereby improving security for access to the physical space.

By requiring that the delegation in itself is signed by both the delegator and the access controller (co-signor), the lock device is relieved of obtaining the signature of the access controller.

Figure 3:
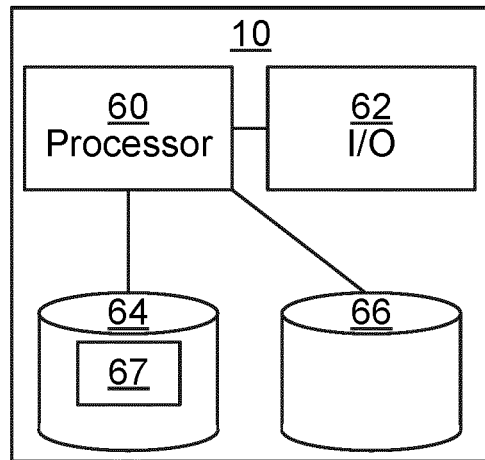
FIG. 3 is a schematic diagram illustrating components of the lock device of FIG. 1.

FIG. 3 is a schematic diagram illustrating components of the lock device 10 of FIG. 1. A processor 60 is provided using any combination of one or more of a suitable central processing unit (CPU), multiprocessor, microcontroller, digital signal processor (DSP), etc., capable of executing software instructions 67 stored in a memory 64, which can thus be a computer program product. The processor 60 could alternatively be implemented using an application specific integrated circuit (ASIC), field programmable gate array (FPGA), etc. The processor 60 can be configured to execute the method described with reference to FIG. 2 above.

The memory 64 can be any combination of random-access memory (RAM) and/or read only memory (ROM). The memory 64 also comprises persistent storage, which, for example, can be any single one or combination of magnetic memory, optical memory, solid-state memory or even remotely mounted memory.

A data memory 66 is also provided for reading and/or storing data during execution of software instructions in the processor 60. The data memory 66 can be any combination of RAM and/or ROM.

The lock device further comprises an I/O interface 62 for communicating with external entities, such as a key device. Optionally, the I/O interface 62 also includes a user interface.

Other components of the lock device 10 are omitted in order not to obscure the concepts presented herein.

Figure 4:
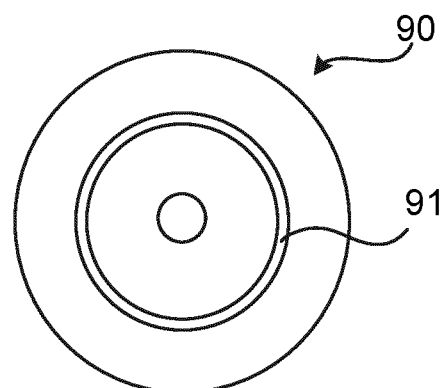
FIG. 4 shows one example of a computer program product 90 comprising computer readable means.

FIG. 4 shows one example of a computer program product 90 comprising computer readable means. On this computer readable means, a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 64 of FIG. 3. While the computer program 91 is here schematically shown as a track on the depicted optical disk, the computer program can be stored in any way which is suitable for the computer program product, such as a removable solid-state memory, e.g. a Universal Serial Bus (USB) drive.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims.

What is claimed is:

1. A method for controlling access to a physical space using a co-sign delegation, the method being performed in a lock device and comprising:
   receiving an access request from an electronic key;
   obtaining a plurality of delegations, wherein each delegation is a delegation from a delegator to a delegatee, the plurality of delegations collectively forming a chain of delegations wherein when two delegations are chained together, the delegatee of one delegation is the delegator of the next delegation;
   determining that a delegation in the chain of delegations is a co-sign delegation, the co-sign delegation indicating that all further delegations need to be cryptographically signed by both the delegator of the respective delegation and by an access controller, wherein the chain of delegations after the co-sign delegation comprises at least two delegations; and
   granting access to the physical space when the chain of delegations start in an owner of the lock device and ends in the electronic key; and when all delegations in the chain of delegations after the co-sign delegation are cryptographically signed by both the delegator of the respective delegation and by the access controller, by verifying that each co-sign delegation has been transmitted to all the delegates in the chain of delegations after the co-sign delegation, and that a co-signed delegation has been signed by the delegator, has been provided to the access controller, and has been signed by the access controller.

2. The method according to claim 1, further comprising:
   evaluating an access controller time constraint applied by the access controller on a delegation of the chain of delegations, and wherein granting access is only performed when the access controller time constraint is not violated.

3. The method according to claim 2, wherein the access controller time constraint is 24 hours or less.

4. The method according to claim 1, further comprising:
   evaluating a delegator time constraint applied by a delegator on a delegation of the chain of delegations, and wherein granting access is only performed when the delegator time constraint is not violated.

5. The method according to claim 1, wherein obtaining a plurality of delegations comprises receiving at least part of the chain of delegations from the electronic key.

6. The method according to claim 1, wherein, in the co-sign delegation, the access controller is specified by a public key of the access controller.

7. A lock device for controlling access to a physical space using a co-sign delegation, the lock device comprising:
   a processor; and
   a memory storing instructions that are configured to, when executed by the processor, cause the lock device to:
      receive an access request from an electronic key;
      obtain a plurality of delegations, wherein each delegation is a delegation from a delegator to a delegatee, the plurality of delegations collectively forming a chain of delegations wherein when two delegations are chained together, the delegatee of one delegation is the delegator of the next delegation;
      determine that a delegation in the chain of delegations is a co-sign delegation, the co-sign delegation indicating that all further delegations need to be cryptographically signed by both the delegator of the respective delegation and by an access controller, wherein the chain of delegations after the co-sign delegation comprises at least two delegations; and
      grant access to the physical space when the chain of delegations start in an owner of the lock device and ends in the electronic key; and when all delegations in the chain of delegations after the co-sign delegation are cryptographically signed by both the delegator of the respective delegation and by the access controller, by verifying that each co-sign delegation has been transmitted to all the delegatees in the chain of delegations after the co-sign delegation, and that a co-signed delegation has been signed by the delegator, has been provided to the access controller, and has been signed by the access controller.

8. The lock device according to claim 7, further comprising instructions that, when executed by the processor, cause the lock device to:
   evaluate an access controller time constraint applied by the access controller on a delegation of the chain of delegations, and wherein the instructions to grant access is only performed when the access controller time constraint is not violated.

9. The lock device according to claim 8, wherein the access controller time constraint is 24 hours or less.

10. The lock device according to claim 7, further comprising instructions that, when executed by the processor, cause the lock device to:
  evaluate a delegator time constraint applied by a delegator on a delegation of the chain of delegations, and wherein the instructions to grant access are only performed when the delegator time constraint is not violated.

11. The lock device according to claim 7, wherein the instructions to obtain a plurality of delegations comprise instructions that, when executed by the processor, cause the lock device to receive at least part of the chain of delegations from the electronic key.

12. The lock device according to claim 7, wherein, in the co-sign delegation, the access controller is specified by a public key of the access controller.

13. A non-transitory computer-readable medium comprising a computer program stored thereon for controlling access to a physical space using a co-sign delegation, the computer program comprising computer program code which is configured to cause, when run on a processor of a lock device, the lock device to:
  receive an access request from an electronic key;
  obtain a plurality of delegations, wherein each delegation is a delegation from a delegator to a delegatee, the plurality of delegations collectively forming a chain of delegations wherein when two delegations are chained together, the delegatee of one delegation is the delegator of the next delegation;
  determine that a delegation in the chain of delegations is a co-sign delegation, the co-sign delegation indicating that all further delegations need to be cryptographically signed by both the delegator of the respective delegation and by an access controller, wherein the chain of delegations after the co-sign delegation comprises at least two delegations; and
  grant access to the physical space when the chain of delegations start in an owner of the lock device and ends in the electronic key; and when all delegations in the chain of delegations after the co-sign delegation are cryptographically signed by both the delegator of the respective delegation and by the access controller, by verifying that each delegation has been transmitted to all the delegatees in the chain of delegations, and that a co-signed delegation has been signed by the delegator, has been provided to the access controller, and has been signed by the access controller.

\* \* \* \* \*